United States Patent
Hsu et al.

(10) Patent No.: US 8,094,387 B2
(45) Date of Patent: Jan. 10, 2012

(54) COMPACT IMAGING LENS ASSEMBLY

(75) Inventors: Po Lun Hsu, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 39 days.

(21) Appl. No.: 12/839,116

(22) Filed: Jul. 19, 2010

(65) Prior Publication Data
US 2011/0181962 A1    Jul. 28, 2011

(30) Foreign Application Priority Data
Jan. 25, 2010   (TW) ................ 99101922 A

(51) Int. Cl.
*G02B 9/04* (2006.01)
*G02B 3/02* (2006.01)

(52) U.S. Cl. .............. 359/795; 359/717; 359/793

(58) Field of Classification Search .............. 359/691, 359/692, 717, 793, 795
See application file for complete search history.

(56) References Cited

U.S. PATENT DOCUMENTS

| | | | | |
|---|---|---|---|---|
| 7,317,585 B2 * | 1/2008 | Liao | .............. | 359/793 |
| 7,436,604 B1 * | 10/2008 | Tang | .............. | 359/717 |
| 7,525,741 B1 | 4/2009 | Noda | | |

* cited by examiner

*Primary Examiner* — Jack Dinh
(74) *Attorney, Agent, or Firm* — Morris Manning & Martin LLP; Tim Tingkang Xia, Esq.

(57) ABSTRACT

This invention provides a compact imaging lens assembly in order from an object side toward an image side including a first lens with positive refractive power having at least one of the object-side and image-side surfaces thereof being aspheric, a second lens with negative refractive power having a concave object-side surface and a concave image-side surface with at least one of both surfaces thereof being aspheric, and an aperture stop positioned between the first lens element and the second lens element. There are two lens elements with refractive power in the compact imaging lens assembly.

20 Claims, 10 Drawing Sheets

| TABLE 1 | | | | | | |
|---|---|---|---|---|---|---|
| (EMBODIMENT 1) | | | | | | |
| f = 5.63 mm, Fno = 2.80, HFOV = 14.2 deg. | | | | | | |
| Surface # | | Curvature Radius | Thickness | Material | Index | Abbe # | Focal length |
| 0 | Object | Plano | Infinity | | | | |
| 1 | Lens 1 | 1.56776 (ASP) | 1.775 | Plastic | 1.514 | 56.8 | 3.82 |
| 2 | | 4.81860 (ASP) | 0.122 | | | | |
| 3 | Ape. Stop | Plano | 0.166 | | | | |
| 4 | Lens 2 | -5.04930 (ASP) | 2.500 | Plastic | 1.632 | 23.4 | -5.05 |
| 5 | | 10.35000 (ASP) | 0.500 | | | | |
| 6 | IR-filter | Plano | 0.300 | Glass | 1.517 | 64.2 | - |
| 7 | | Plano | 0.663 | | | | |
| 8 | Image | Plano | | | | | |

Fig. 4

| TABLE 2 | | | | |
|---|---|---|---|---|
| Aspheric Coefficients | | | | |
| Surface # | 1 | 2 | 4 | 5 |
| k = | 1.57597E-01 | -1.00000E+00 | 0.00000E+00 | 1.88702E+01 |
| A4 = | -1.24931E-02 | -5.43013E-02 | -1.48686E-01 | -1.80621E-02 |
| A6 = | 1.20143E-03 | -2.79530E-01 | -2.28180E-01 | -7.30192E-03 |
| A8 = | -1.25385E-02 | 7.26399E-01 | 5.98167E-01 | 1.00189E-02 |
| A10= | 1.06433E-02 | -2.10110E+00 | -3.67255E+00 | -1.79661E-03 |
| A12= | -8.63497E-03 | 2.78540E+00 | 8.73267E+00 | 4.24889E-03 |
| A14= | 4.26760E-03 | -1.73194E+00 | -7.98390E+00 | -1.73374E-02 |
| A16= | -1.53868E-03 | 6.13694E-01 | 1.37632E-01 | 1.04670E-02 |

Fig. 5

| TABLE 3 | | | | | | | |
|---|---|---|---|---|---|---|---|
| (EMBODIMENT 2) | | | | | | | |
| f = 3.69 mm, Fno = 2.80, HFOV = 21.3 deg. | | | | | | | |
| Surface # | | Curvature Radius | Thickness | Material | Index | Abbe # | Focal length |
| 0 | Object | Plano | Infinity | | | | |
| 1 | Lens 1 | 1.46988 (ASP) | 0.529 | Plastic | 1.544 | 55.9 | 2.96 |
| 2 | | 14.61930 (ASP) | 0.037 | | | | |
| 3 | Ape. Stop | Plano | 1.188 | | | | |
| 4 | Lens 2 | -12.50000 (ASP) | 0.800 | Plastic | 1.583 | 30.2 | -5.26 |
| 5 | | 4.16670 (ASP) | 0.600 | | | | |
| 6 | IR-filter | Plano | 0.300 | Glass | 1.517 | 64.2 | - |
| 7 | | Plano | 0.315 | | | | |
| 8 | Image | Plano | | | | | |

Fig. 6

| TABLE 4 | | | | |
|---|---|---|---|---|
| Aspheric Coefficients | | | | |
| Surface # | 1 | 2 | 4 | 5 |
| k = | -1.94404E+00 | -1.00000E+00 | -1.00000E+00 | -1.91535E+02 |
| A4 = | -4.91434E-03 | -7.35196E-02 | -4.08257E-01 | -3.59525E-03 |
| A6 = | 1.68377E-01 | -2.56006E-01 | 6.33136E-01 | -2.25704E-01 |
| A8 = | -1.08009E+00 | 4.77416E-01 | -3.12629E+00 | 2.01298E-01 |
| A10= | 2.01972E+00 | 9.87101E-02 | 5.47318E+00 | -4.92699E-02 |
| A12= | -7.20990E-01 | -3.12646E+00 | -3.40131E+00 | -8.19725E-02 |
| A14= | -3.78122E+00 | 8.03240E-01 | -3.60770E+00 | 6.66215E-02 |
| A16= | 4.09538E+00 | 6.94415E+00 | 1.71046E+00 | -1.51459E-02 |

Fig. 7

| TABLE 5 | | | | | | |
|---|---|---|---|---|---|---|
| (EMBODIMENT 3) | | | | | | |
| f = 3.86 mm, Fno =2.45, HFOV = 20.5deg. | | | | | | |
| Surface # | | Curvature Radius | Thickness | Material | Index | Abbe # | Focal length |
| 0 | Object | Plano | Infinity | | | | |
| 1 | Lens 1 | 1.93551 (ASP) | 1.044 | Plastic | 1.544 | 55.9 | 3.12 |
| 2 | | -11.11110 (ASP) | -0.021 | | | | |
| 3 | Ape. Stop | Plano | 0.766 | | | | |
| 4 | Lens 2 | -12.50000 (ASP) | 1.600 | Plastic | 1.632 | 23.4 | -6.23 |
| 5 | | 6.03530 (ASP) | 0.600 | | | | |
| 6 | IR-filter | Plano | 0.300 | Glass | 1.517 | 64.2 | - |
| 7 | | Plano | 0.308 | | | | |
| 8 | Image | Plano | | | | | |

Fig. 8

| TABLE 6 | | | | |
|---|---|---|---|---|
| Aspheric Coefficients | | | | |
| Surface # | 1 | 2 | 4 | 5 |
| k = | -1.45784E+00 | -1.00000E+00 | -1.00000E+00 | -3.26310E+00 |
| A4 = | -1.93195E-02 | -9.93448E-02 | -1.99017E-01 | -1.72341E-02 |
| A6 = | -1.55026E-02 | -1.83850E-01 | -2.97337E-02 | -7.51367E-02 |
| A8 = | -4.32900E-02 | 1.67911E-01 | -1.86777E-02 | 7.09204E-02 |
| A10= | -7.45776E-03 | 2.95713E-01 | -4.91845E-01 | -1.94220E-02 |
| A12= | 1.78259E-02 | -4.19851E-01 | -5.66609E-02 | -1.61755E-02 |
| A14= | 1.69959E-02 | -5.77998E-01 | 8.93493E-01 | 1.07243E-02 |
| A16= | -2.93839E-02 | 7.93430E-01 | 8.39032E-03 | -1.24578E-03 |

Fig. 9

| TABLE 7 | | | |
|---|---|---|---|
| | Embodiment 1 | Embodiment 2 | Embodiment 3 |
| f | 5.63 | 3.69 | 3.86 |
| Fno | 2.80 | 2.80 | 2.45 |
| HFOV | 14.2 | 21.3 | 20.5 |
| V1-V2 | 33.4 | 25.7 | 32.5 |
| |R1/R2| | 0.33 | 0.10 | 0.17 |
| R3/R4 | -0.49 | -3.00 | -2.07 |
| CT2/f | 0.44 | 0.22 | 0.41 |
| f/f1 | 1.47 | 1.25 | 1.24 |
| f1/f2 | -0.76 | -0.56 | -0.50 |
| Bf/f | 0.24 | 0.30 | 0.29 |
| SL/TTL | 0.68 | 0.85 | 0.77 |
| TTL/ImgH | 4.12 | 2.55 | 3.12 |

Fig. 10

COMPACT IMAGING LENS ASSEMBLY

CROSS-REFERENCE TO RELATED APPLICATIONS

This non-provisional application claims priority under 35 U.S.C. §119(a) on Patent Application No(s). 099101922 filed in Taiwan, R.O.C. on Jan. 25, 2010, the entire contents of which are hereby incorporated by reference.

BACKGROUND OF THE INVENTION

1. Field of the Invention

The present invention relates to a compact imaging lens assembly, and more particularly, to an imaging lens assembly for compact camera modules.

2. Description of the Prior Art

In recent years, with the popularity of camera modules, the demand for compact imaging lenses is increasing, and the sensor of a general photographing camera is none other than CCD (charge coupled device) or CMOS sensor (Complementary Metal Oxide Semiconductor Sensor). Furthermore, the pixel size of sensors is reduced due to the advancing semiconductor manufacturing technology and makes electronic products become more compact and powerful. Therefore, there is an increasing demand for compact imaging lenses with superb image quality.

A conventional compact imaging lens is generally configured as a three-lens element structure for the purpose of aberration correction, which a positive-negative-positive Triplet structure is usually adopted. When the lens continues to reduce in size, imaging space in the system also reduces. Thus, the insertion of three lens elements becomes difficult, and within a limited space, the thickness of the lens also decreases, which causes unevenness of the plastic lens material from injection molding process.

In order to effectively reduce the total track length of the lens assembly while maintaining high yield in lens manufacturing, two-lens structure proves to be the best solution. For the purpose of correcting aberrations, usually an arrangement of frontal aperture stop is adopted, such as a compact imaging lens assembly comprising two lens elements disclosed in U.S. Pat. No. 7,525,741. However, a frontal aperture stop setup will generate too much unwanted light entry, which increases the sensitivity of the optical system, and ultimately makes it difficult to control the yield in manufacturing process.

Therefore, a need exists in the art for a compact imaging lens assembly that requires simple manufacturing process, without total track length of the system being too long and the system sensitivity being too high.

SUMMARY OF THE INVENTION

The present invention provides a compact imaging lens assembly comprising, in order from an object side to an image side: a first lens element with positive refractive power, at least one of the object-side and image-side surfaces thereof being aspheric; a second lens element with negative refractive power having a concave object-side surface and a concave image-side surface, at least one of the object-side and image-side surfaces thereof being aspheric; and an aperture stop disposed between the first element and the second lens element; wherein there are two lens elements with refractive power in the compact imaging lens assembly; and wherein the compact imaging lens assembly further comprises an electronic sensor disposed at the image plane for image formation thereon, the distance on the optical axis between the aperture stop and the electronic sensor is SL, the distance on the optical axis between the object-side surface of the first lens element and the electronic sensor is TTL, the distance on the optical axis between the image-side surface of the second lens element and the electronic sensor is Bf, the focal length of the compact imaging lens assembly is f, and they satisfy the relations: $0.58 < SL/TTL < 0.88$; $0.18 < Bf/f < 0.60$.

According to another aspect of the present invention, a compact imaging lens assembly comprises, in order from the object side to the image side: a first lens element with positive refractive power having a convex object-side surface; a second lens element with negative refractive power having a concave object-side surface and a concave image-side surface, at least one surface of the first and second lens elements being aspheric; and an aperture stop disposed between the first lens element and the second lens element; wherein there are two lens elements with refractive power in the compact imaging lens assembly; wherein the compact imaging lens assembly further comprises an electronic sensor disposed at the image plane for image formation thereon; and wherein the distance on the optical axis between the aperture stop and the electronic sensor is SL, the distance on the optical axis between the object-side surface of the first lens element and the electronic sensor is TTL, the radius of curvature on the object-side surface of the first lens element is R1, the radius of curvature on the image-side surface of the first lens element is R2, the Abbe number of the first lens element is V1, the Abbe number of the second lens element is V2, and they satisfy the relation: $0.58 < SL/TTL < 0.88$; $|R1/R2| < 0.45$; $23.0 < V1 - V2 < 46.0$.

Such an arrangement of optical elements can effectively reduce the total track length of the lens assembly, lower the system sensitivity, and obtains high image quality.

In the present compact imaging lens assembly, the first lens element has positive refractive power, as the main source of refractive power of the system, which reduces the total track length of the optical system; the second lens element has negative refractive power, which effectively corrects the aberration generated from the positive refractive power of the first lens element and corrects the chromatic aberration of the system at the same time.

In the present compact imaging lens assembly, the first lens element may be a meniscus lens element having a convex object-side surface and a concave image-side surface, or a bi-convex lens element. When the first lens element is a convex-concave meniscus lens element, the astigmatism of the system can be favorably corrected. When the first lens element is bi-convex, the refractive power of the first lens element can be effectively enhanced, and the total track length of the optical system can be shortened. When the second lens element is a bi-concave lens element with negative refractive power, the negative refractive power of the second lens element can be effectively enhanced in order to correct the chromatic aberration of the system.

In the aforementioned compact imaging lens assembly of the present invention, the aperture stop is disposed between the first lens element and the second lens element. The first lens element provides positive refractive power which effectively reduces the total track length of the compact imaging lens assembly. In the present compact imaging lens assembly, the aperture stop is disposed between the first lens element and the second lens element, which can reduce the stray light generated in the system and can obtain a good balance between reducing the size of the lens assembly and the sensitivity of the system.

BRIEF DESCRIPTION OF THE DRAWINGS

FIG. 4 is TABLE 1 which lists the optical data of the first embodiment.

FIG. 5 is TABLE 2 which lists the aspheric surface data of the first embodiment.

FIG. 6 is TABLE 3 which lists the optical data of the second embodiment.

FIG. 7 is TABLE 4 which lists the aspheric surface data of the second embodiment.

FIG. 8 is TABLE 5 which lists the optical data of the third embodiment.

FIG. 9 is TABLE 6 which lists the aspheric surface data of the third embodiment.

FIG. 10 is TABLE 7 which lists the data of the respective embodiments resulting from the equations.

DETAILED DESCRIPTION OF THE PREFERRED EMBODIMENTS

Figure 1A:
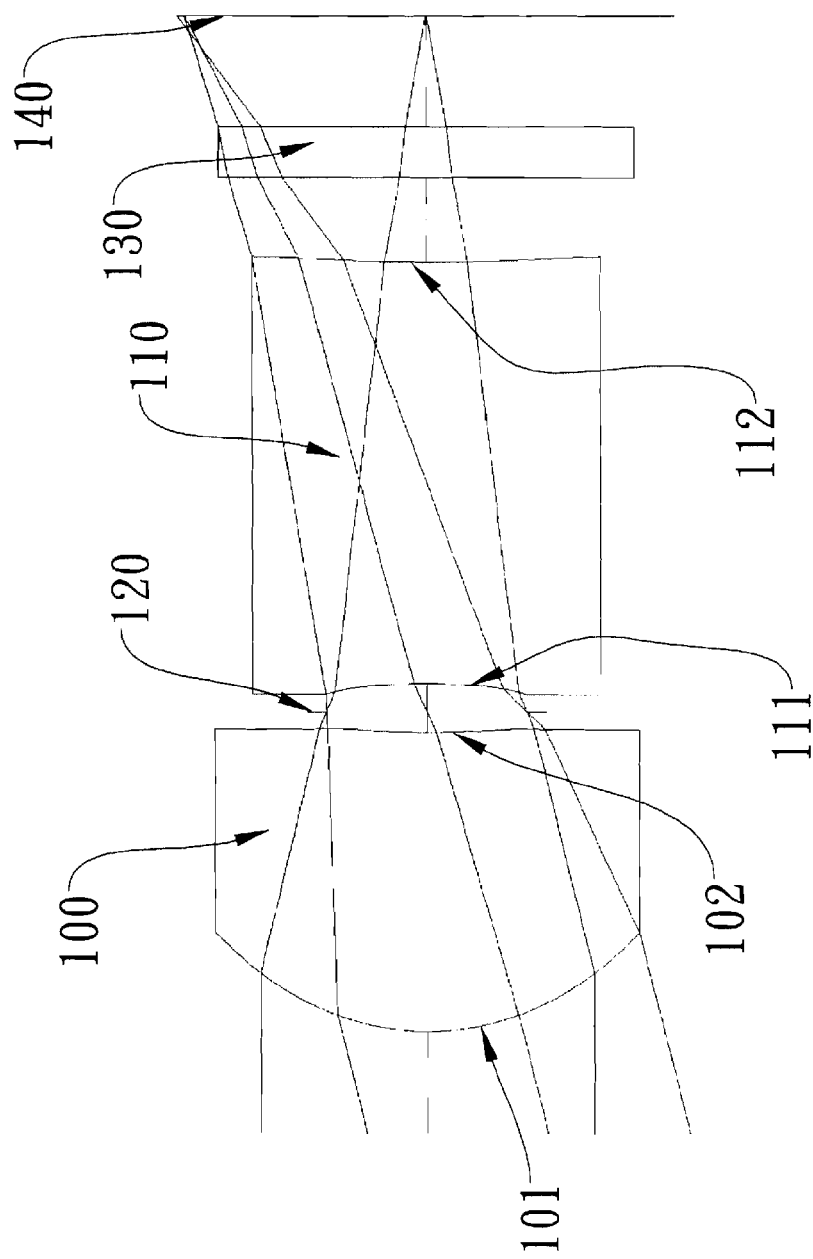
FIG. 1A shows a compact imaging lens assembly in accordance with a first embodiment of the present invention.

The present invention provides a compact imaging lens assembly comprising, in order from an object side to an image side: a first lens element with positive refractive power, at least one of the object-side and image-side surfaces thereof being aspheric; a second lens element with negative refractive power having a concave object-side surface and a concave image-side surface, at least one of the object-side and image-side surfaces thereof being aspheric; and an aperture stop disposed between the first lens element and the second lens element; wherein there are two lens elements with refractive power in the compact imaging lens assembly; and wherein the compact imaging lens assembly further provides an electronic sensor for image formation, the distance on the optical axis between the aperture stop and the electronic sensor is SL, the distance on the optical axis between the object-side surface of the first lens element and the electronic sensor is TTL, the distance on the optical axis between the image-side surface of the second lens element and the electronic sensor is Bf, the focal length of the compact imaging lens assembly is f, and they satisfy the relations: $0.58<SL/TTL<0.88$; $0.18<Bf/f<0.60$.

When the aforementioned compact imaging lens assembly satisfies the relation of $0.58<SL/TTL<0.88$, a good balance between reducing the size of the lens assembly and lowering the sensitivity of the system can be obtained. When the aforementioned compact imaging lens assembly satisfies the relation of $0.18<Bf/f<0.60$, there is enough back focal distance in the lens assembly to allocate other components while preventing the total track length of the lens system from becoming too long; preferably, it satisfies the relation: $0.20<Bf/f<0.35$.

In the aforementioned compact imaging lens assembly of the present invention, preferably, the first lens element has a convex object-side surface, which enhances the refractive power of the first lens element in order to reduce the total track length of the lens assembly; moreover, the first lens element preferably has a convex object-side surface and a convex image-side surface.

In the aforementioned compact imaging lens assembly of the present invention, preferably, the first lens element made of plastic materials has the object-side and the image-side surfaces being aspheric, and the second lens element made of plastic materials also has the both surfaces being aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced. By using plastic materials, it becomes favorable for the making of aspheric lenses and the manufacturing cost can be effectively reduced.

In the aforementioned compact imaging lens assembly of the present invention, preferably, the second lens element has at least one inflection point formed on the image-side surface, which can effectively reduce the angle of off-axis light ray projecting onto the electronic sensor.

In the aforementioned compact imaging lens assembly of the present invention, the focal length of the compact imaging lens assembly is f, the focal length of the first lens element is f1, and preferably, they satisfy the relation: $1.0<f/f1<1.7$. When f/f1 satisfies the relation, the refractive power of the first lens element is more balanced, which can effectively maintain the total track length of the optical system, the compact feature of the system, and prevent the high order spherical aberration from becoming too large, in order to improve image quality; moreover, it satisfies the relation: $1.2<f/f1<1.5$.

In the aforementioned compact imaging lens assembly of the present invention, the thickness on the optical axis of the second lens element is CT2, the focal length of the compact imaging lens assembly is f, and preferably, they satisfy the relation: $0.18<CT2/f<0.48$. When CT/f satisfies the relation, it can provide better moldability and homogeneity of the plastic-injection-molded lenses to ensure the good image quality of the compact imaging lens assembly.

In the aforementioned compact imaging lens assembly of the present invention, the radius of curvature on the object-side surface of the first lens element is R1, the radius of curvature on the image-side surface of the first lens element is R2, and preferably, they satisfy the relation: $|R1/R2|<0.35$. When R1, R2 satisfy the relation, the spherical aberration of the system can be effectively corrected.

In the aforementioned compact imaging lens assembly of the present invention, the radius of curvature on the object-side surface of the second lens element is R3, the radius of curvature on the image-side surface of the second lens element is R4, and preferably, they satisfy the relation: $-3.50<R3/R4<-0.15$. When R3/R4 satisfies the relation, the high order aberration of the system can be favorably corrected.

In the aforementioned compact imaging lens assembly of the present invention, the distance on the optical axis between the object-side of the first lens element and the electronic sensor is TTL, half of the diagonal length of the effective pixel area on the electronic sensor is ImgH, and preferably, they satisfy the relation: $TTL/ImgH<4.5$. When TTL/ImgH satisfies the relation, the compact imaging lens assembly can be favorably maintained in compact size for applications of light weight mobile electronic products.

According to another aspect of the present invention, a compact imaging lens assembly comprises, in order from the object side to the image side: a first lens element with positive refractive power having a convex object-side surface; a second lens element with negative refractive power having a concave object-side surface and a concave image-side surface, at least one of the object-side and image-side surfaces thereof being aspheric; and an aperture stop disposed between the first lens element and the second lens element; wherein there are two lens elements with refractive power in the compact imaging lens assembly; wherein the compact imaging lens assembly further comprises an electronic sensor for image formation; and wherein the distance on the optical axis between the aperture stop and the electronic sensor is SL, the distance on the optical axis between the object-side surface of the first lens element and the electronic sensor is TTL, the radius of curvature on the object-side surface of the first lens element is R1, the radius of curvature on the image-side surface of the first lens element is R2, the Abbe number of the first lens element is V1, the Abbe number of the second lens element is V2, and they satisfy the relation: 0.58<SL/TTL<0.88; |R1/R2|<0.45; 23.0<V1−V2<46.0.

When the aforementioned compact imaging lens assembly satisfies the relation: 0.58<SL/TTL<0.88, a good balance between reducing the size of the lens assembly and lowering the sensitivity of the system can be obtained. When the aforementioned compact imaging lens assembly satisfies the relation: |R1/R2|<0.45, the spherical aberration of the system can be favorably corrected. When the aforementioned compact imaging lens assembly satisfies the relation: 23.0<V1−V2<46.0, the chromatic aberration of the compact imaging lens assembly can be favorably corrected; moreover, they satisfy the relation: 30.0<V1−V2<38.0.

In the aforementioned compact imaging lens assembly of the present invention, the focal length of the compact imaging lens assembly is f, the focal length of the first lens element is f1, and preferably, they satisfy the relation: 1.0<f/f1<1.7. When f/f1 satisfies the relation, the distribution of the refractive power of the first lens element is more balanced, which can effectively control the total track length of the system to stay compact while preventing the high order spherical aberration from becoming too large, in order to improve image quality; moreover, it preferably satisfies the relation: 1.2<f/f1<1.5.

In the aforementioned compact imaging lens assembly of the present invention, the focal length of the first lens element is f1, the focal length of the second lens element is f2, and preferably, they satisfy the relation: −0.80<f1/f2<−0.45. When f1/f2 satisfies the relation, the distribution of refractive power is more balanced between the first and second lens elements, which can correct the aberration and lower the sensitivity.

In the aforementioned compact imaging lens assembly of the present invention, the radius of curvature on the object-side surface of the second lens element is R3, the radius of curvature on the image-side surface of the second lens element is R4, and preferably, they satisfy the relation: −3.50<R3/R4<−0.15. When R3/R4 satisfies the relation, the high order aberration of the system can be favorably corrected.

In the aforementioned compact imaging lens assembly of the present invention, the distance on the optical axis between the image-side surface of the second lens element and the electronic sensor is Bf, the focal length of the compact imaging lens assembly is f, and preferably, they satisfy the relation: 0.20<Bf/f<0.35. When Bf/f satisfies the relation, there is enough back focal distance in the lens assembly to allocate other components while preventing the total track length of the lens system from becoming too long.

In the present compact imaging lens assembly, the lens elements can be made of glass or plastic materials. If the lens elements are made of glass, there is more freedom in distributing the refractive power of the system. If plastic material is adopted to produce lens elements, the manufacturing cost will be reduced effectively. Moreover, surfaces of the lens elements can be made aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced.

In the present compact imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
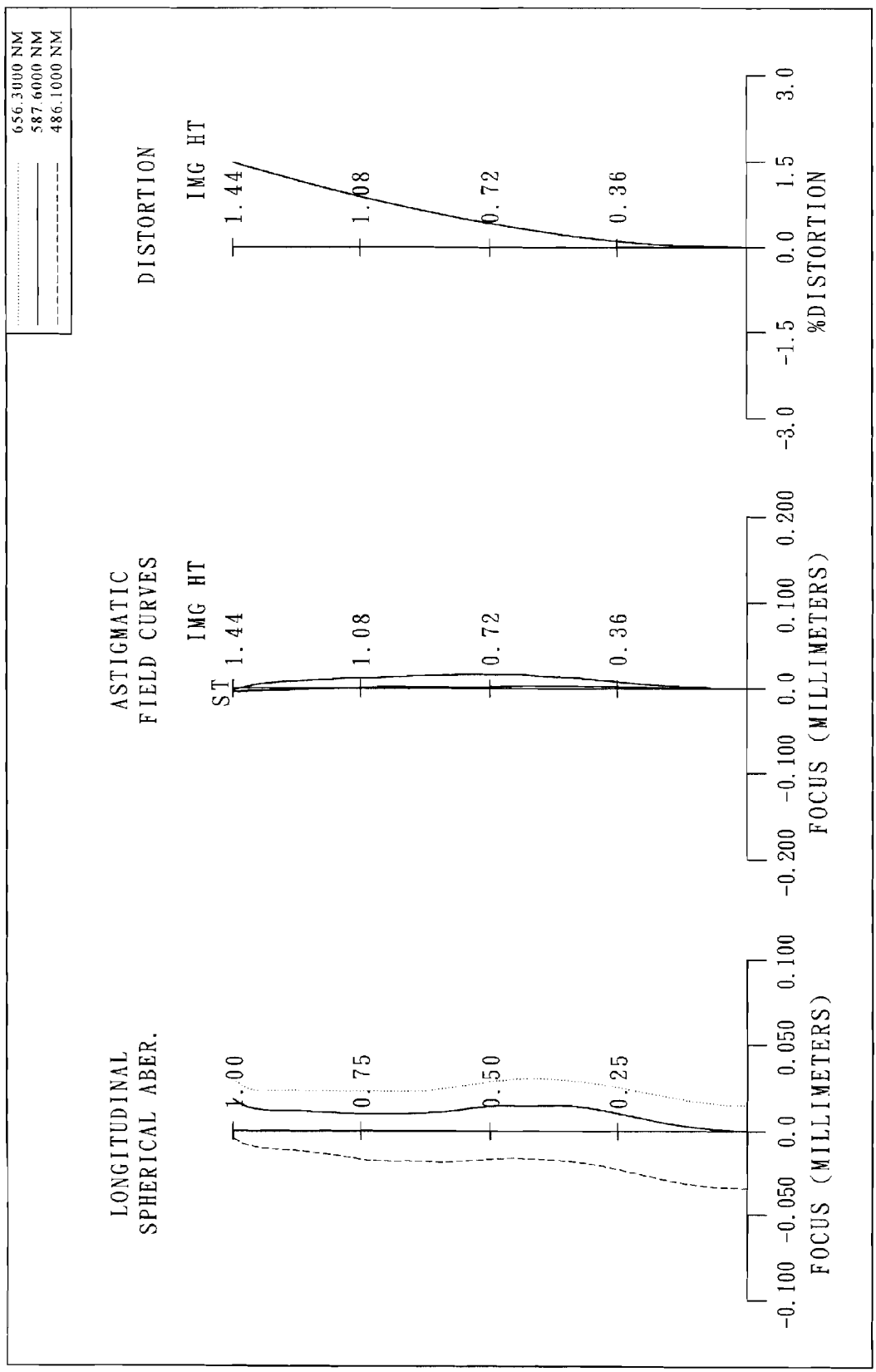
FIG. 1B shows the aberration curves of the first embodiment of the present invention.

FIG. 1A shows a compact imaging lens assembly in accordance with a first embodiment of the present invention, and FIG. 1B shows the aberration curves of the first embodiment of the present invention. The compact imaging lens assembly of the first embodiment of the present invention mainly comprises two lens elements, in order from an object side to an image side: a plastic first lens element 100 with positive refractive power having a convex object-side surface 101 and a concave image-side surface 102, the object-side and image-side surfaces 101 and 102 thereof being aspheric; and a plastic second lens element 110 with negative refractive power having a concave object-side surface 111 and a concave image-side surface 112, the object-side and image-side surfaces 111 and 112 thereof being aspheric, at least one inflection point formed on the image-side surface 112; wherein an aperture stop 120 is disposed between the first lens element 100 and the second lens element 110; wherein an IR filter 130 is disposed between the image-side surface 112 of the second lens element 110 and the image plane 140; and wherein the IR filter 130 has no influence on the focal length of the compact imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present compact imaging lens assembly, the focal length of the compact imaging lens assembly is f, and it satisfies the relation: f=5.63 (mm).

In the first embodiment of the present compact imaging lens assembly, the f-number of the compact imaging lens assembly is Fno, and it satisfies the relation: Fno=2.80.

In the first embodiment of the present compact imaging lens assembly, half of the maximal field of view of the compact imaging lens assembly is HFOV, and it satisfies the relation: HFOV=14.2 deg.

In the first embodiment of the present compact imaging lens assembly, the distance on the optical axis between the aperture stop 120 and the image plane 140 is SL, the distance on the optical axis between the object-side surface 101 of the first lens element 100 and the electronic sensor is TTL, and they satisfy the relation: SL/TTL=0.68.

In the first embodiment of the present compact imaging lens assembly, the distance on the optical axis between the image-side surface 112 of the second lens element 110 and the image plane 140 is Bf, the focal length of the compact imaging lens assembly is f, and they satisfy the relation: Bf/f=0.24.

In the first embodiment of the present compact imaging lens assembly, the focal length of the compact imaging lens assembly is f, the focal length of the first lens element 100 is f1, and they satisfy the relation: f/f1=1.47.

In the first embodiment of the present compact imaging lens assembly, the focal length of the first lens element 100 is f1, the focal length of the second lens element 110 is f2, and they satisfy the relation: f1/f2=−0.76.

In the first embodiment of the present compact imaging lens assembly, the thickness on the optical axis of the second lens element 110 is CT2, the focal length of the compact imaging lens assembly is f, and they satisfy the relation: CT2/f=0.44.

In the first embodiment of the present compact imaging lens assembly, the radius of curvature of the object-side surface 101 of the first lens element 100 is R1, the radius of curvature of the image-side surface 102 of the first lens element 100 is R2, and they satisfy the relation: |R1/R2|=0.33.

In the first embodiment of the present compact imaging lens assembly, the radius of curvature of the object-side surface 111 of the second lens element 110 is R3, the radius of curvature of the image-side surface 112 of the first lens element 110 is R4, and they satisfy the relation: R3/R4=−0.49.

In the first embodiment of the present compact imaging lens assembly, the Abbe number of the first lens element 100 is V1, the Abbe number of the second lens element 110 is V2, and they satisfy the relation: V1−V2=33.4.

In the first embodiment of the present compact imaging lens assembly, the distance on the optical axis between the object-side surface 101 of the first lens element 100 and the electronic sensor is TTL, half of the diagonal length of the effective pixel area of the electronic sensor is ImgH, and they satisfy the relation: TTL/ImgH=4.12.

The detailed optical data of the first embodiment is shown in FIG. 4 (TABLE 1), and the aspheric surface data is shown in FIG. 5 (TABLE 2), wherein the units of the radius of curvature, the thickness and the focal length are expressed in mm, and HFOV is half of the maximal field of view.

Figure 2A:
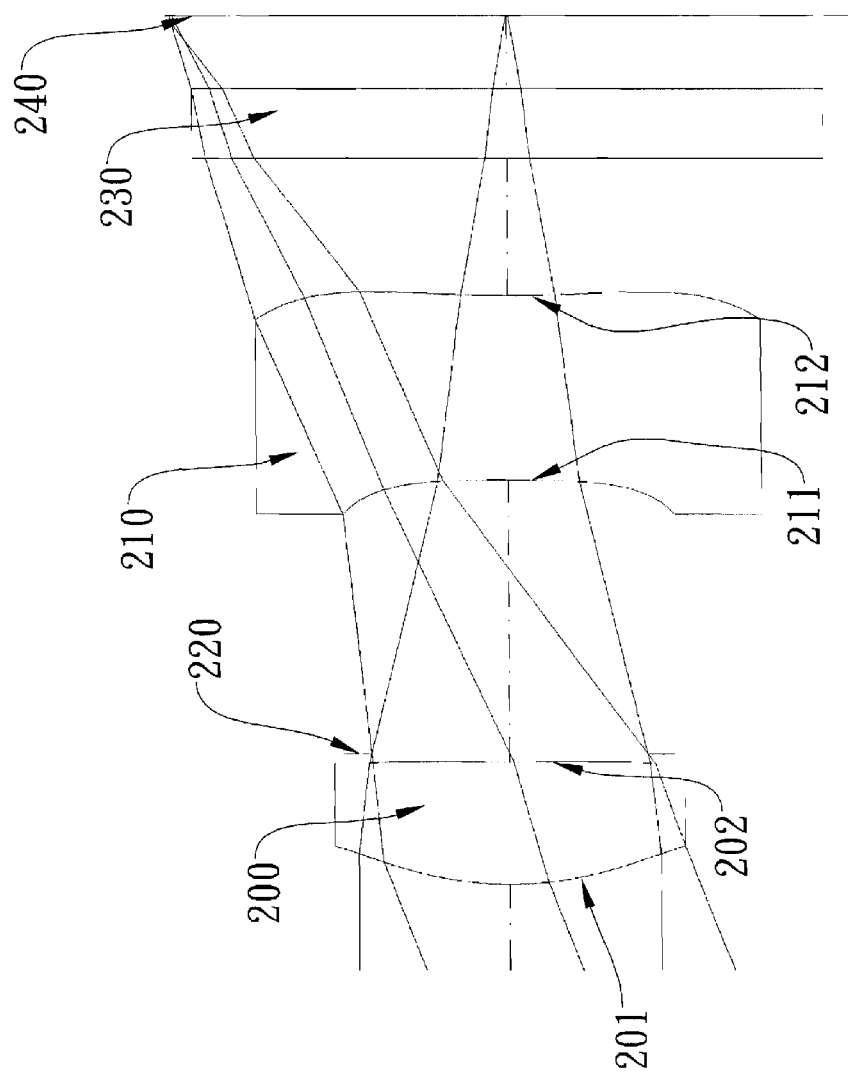
FIG. 2A shows a compact imaging lens assembly in accordance with a second embodiment of the present invention.
Figure 2B:
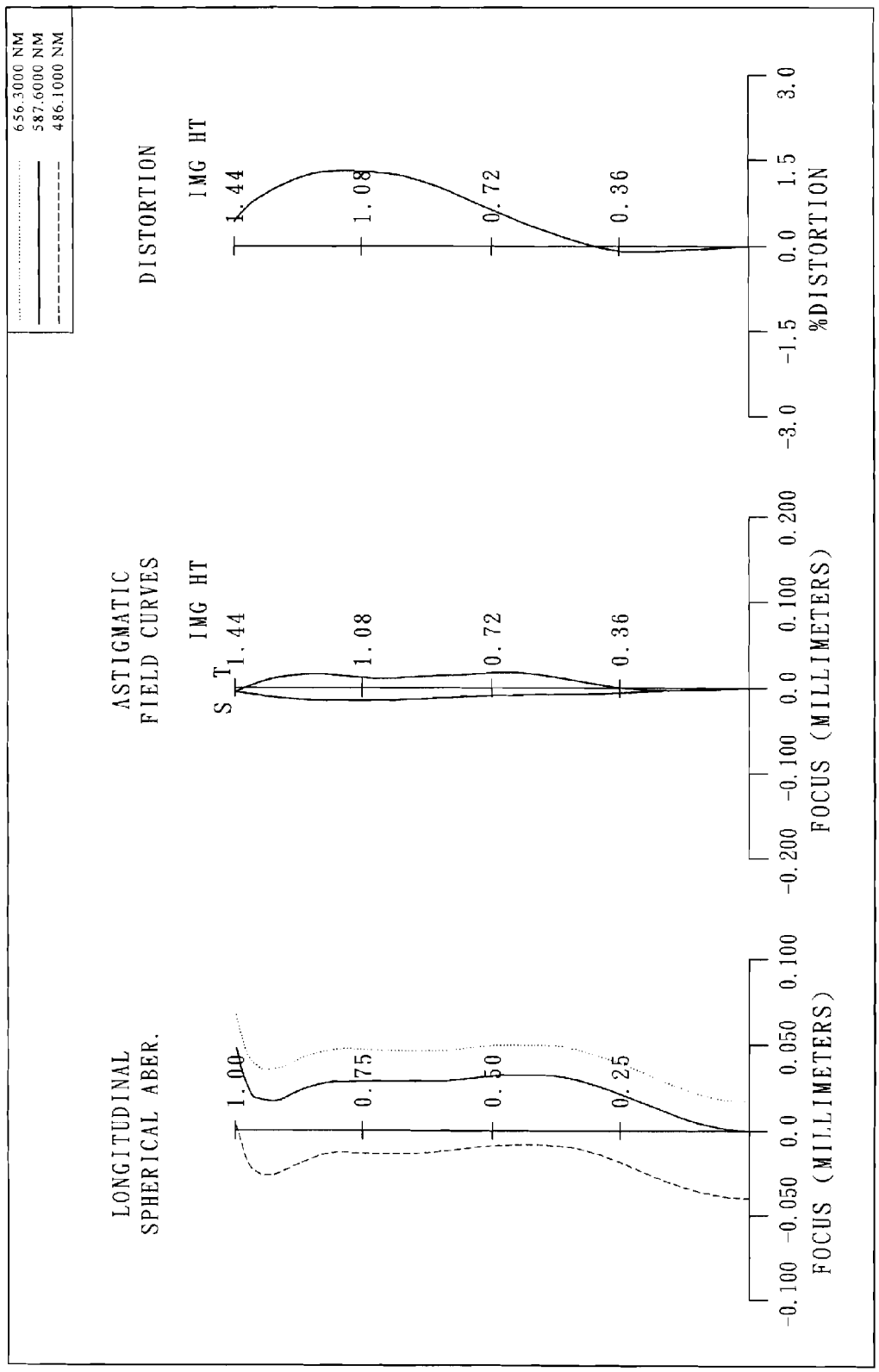
FIG. 2B shows the aberration curves of the second embodiment of the present invention.

FIG. 2A shows a compact imaging lens assembly in accordance with a second embodiment of the present invention, and FIG. 2B shows the aberration curves of the second embodiment of the present invention. The compact imaging lens assembly of the second embodiment of the present invention mainly comprises two lens elements, in order from the object side to the image side: a plastic first lens element 200 with positive refractive power having a convex object-side surface 201 and a concave image-side surface 202, the object-side and image-side surfaces 201 and 202 thereof being aspheric; and a plastic second lens element 210 with negative refractive power having a concave object-side surface 211 and a concave image-side surface 212, the object-side and image-side surfaces 211 and 212 thereof being aspheric, at least one inflection point formed on the image-side surface 212; wherein an aperture stop 220 is disposed between the first lens element 200 and the second lens element 210; wherein an IR filter 230 is disposed between the image-side surface 212 of the second lens element 210 and the image plane 240; and wherein the IR filter 230 has no influence on the focal length of the compact imaging lens assembly.

The equation of the aspheric surface profiles of the second embodiment has the same form as that of the first embodiment.

In the second embodiment of the present compact imaging lens assembly, the focal length of the compact imaging lens assembly is f, and it satisfies the relation: f=3.69 (mm).

In the second embodiment of the present compact imaging lens assembly, the f-number of the compact imaging lens assembly is Fno, and it satisfies the relation: Fno=2.80.

In the second embodiment of the present compact imaging lens assembly, half of the maximal field of view of the compact imaging lens assembly is HFOV, and it satisfies the relation: HFOV=21.3 deg.

In the second embodiment of the present compact imaging lens assembly, the distance on the optical axis between the aperture stop 220 and the image plane 240 is SL, the distance on the optical axis between the object-side surface 201 of the first lens element 200 and the electronic sensor is TTL, and they satisfy the relation: SL/TTL=0.85.

In the second embodiment of the present compact imaging lens assembly, the distance on the optical axis between the image-side surface 212 of the second lens element 210 and the image plane 240 is Bf, the focal length of the compact imaging lens assembly is f, and they satisfy the relation: Bf/f=0.30.

In the second embodiment of the present compact imaging lens assembly, the focal length of the compact imaging lens assembly is f, the focal length of the first lens element 200 is f1, and they satisfy the relation: f/f1=1.25.

In the second embodiment of the present compact imaging lens assembly, the focal length of the first lens element 200 is f1, the focal length of the second lens element 210 is f2, and they satisfy the relation: f1/f2=−0.56.

In the second embodiment of the present compact imaging lens assembly, the thickness on the optical axis of the second lens element 210 is CT2, the focal length of the compact imaging lens assembly is f, and they satisfy the relation: CT2/f=0.22.

In the second embodiment of the present compact imaging lens assembly, the radius of curvature of the object-side surface 201 of the first lens element 200 is R1, the radius of curvature of the image-side surface 202 of the first lens element 200 is R2, and they satisfy the relation: |R1/R2|=0.10.

In the second embodiment of the present compact imaging lens assembly, the radius of curvature of the object-side surface 211 of the second lens element 210 is R3, the radius of curvature of the image-side surface 212 of the first lens element 210 is R4, and they satisfy the relation: R3/R4=−3.00.

In the second embodiment of the present compact imaging lens assembly, the Abbe number of the first lens element 200 is V1, the Abbe number of the second lens element 210 is V2, and they satisfy the relation: V1−V2=25.7.

In the second embodiment of the present compact imaging lens assembly, the distance on the optical axis between the object-side surface 201 of the first lens element 200 and the electronic sensor is TTL, half of the diagonal length of the effective pixel area of the electronic sensor is ImgH, and they satisfy the relation: TTL/ImgH=2.55.

The detailed optical data of the second embodiment is shown in FIG. 6 (TABLE 3), and the aspheric surface data is shown in FIG. 9 (TABLE 4), wherein the units of the radius of curvature, the thickness and the focal length are expressed in mm, and HFOV is half of the maximal field of view.

Figure 3A:
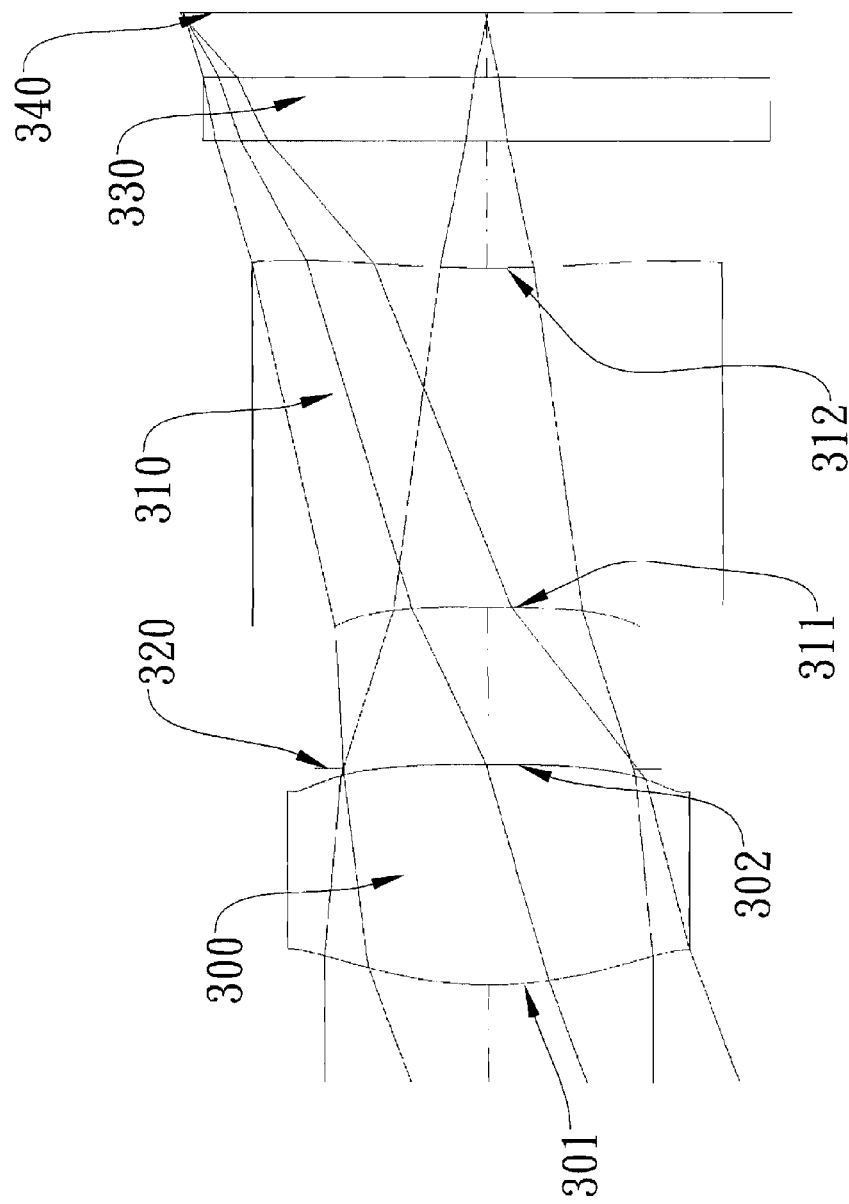
FIG. 3A shows a compact imaging lens assembly in accordance with a third embodiment of the present invention.
Figure 3B:
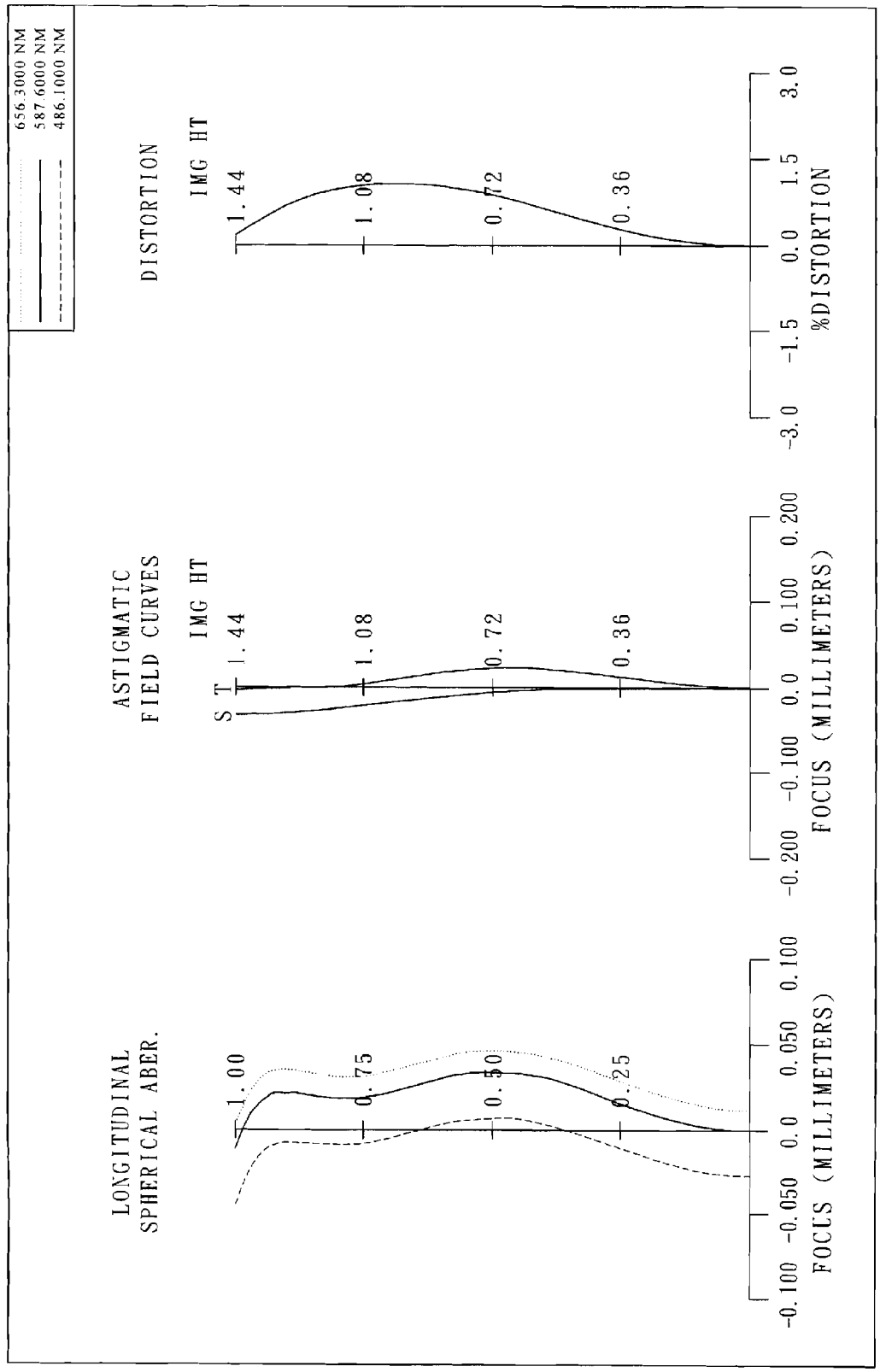
FIG. 3B shows the aberration curves of the third embodiment of the present invention.

FIG. 3A shows a compact imaging lens assembly in accordance with a third embodiment of the present invention, and FIG. 3B shows the aberration curves of the third embodiment of the present invention. The compact imaging lens assembly of the third embodiment of the present invention mainly comprises two lens elements, in order from the object side to the image side: a plastic first lens element 300 with positive refractive power having a convex object-side surface 301 and a convex image-side surface 302, the object-side and image-side surfaces 301 and 302 thereof being aspheric; and a plastic second lens element 310 with negative refractive power having a concave object-side surface 311 and a concave image-side surface 312, the object-side and image-side surfaces 311 and 312 thereof being aspheric, at least one inflection point formed on the image-side surface 312; wherein an aperture stop 320 is disposed between the first lens element 300 and the second lens element 310; wherein an IR filter 330 is disposed between the image-side surface 312 of the second lens element 310 and the image plane 340; and wherein the IR filter 330 has no influence on the focal length of the compact imaging lens assembly.

The equation of the aspheric surface profiles of the third embodiment has the same form as that of the first embodiment.

In the third embodiment of the present compact imaging lens assembly, the focal length of the compact imaging lens assembly is f, and it satisfies the relation: f=3.86 (mm).

In the third embodiment of the present compact imaging lens assembly, the f-number of the compact imaging lens assembly is Fno, and it satisfies the relation: Fno=2.45.

In the third embodiment of the present compact imaging lens assembly, half of the maximal field of view of the compact imaging lens assembly is HFOV, and it satisfies the relation: HFOV=20.5 deg.

In the third embodiment of the present compact imaging lens assembly, the distance on the optical axis between the aperture stop 320 and the image plane 340 is SL, the distance on the optical axis between the object-side surface 301 of the first lens element 300 and the electronic sensor is TTL, and they satisfy the relation: SL/TTL=0.77.

In the third embodiment of the present compact imaging lens assembly, the distance on the optical axis between the image-side surface 312 of the second lens element 310 and the image plane 340 is Bf, the focal length of the compact imaging lens assembly is f, and they satisfy the relation: Bf/f=0.29.

In the third embodiment of the present compact imaging lens assembly, the focal length of the compact imaging lens assembly is f, the focal length of the first lens element 300 is f1, and they satisfy the relation: f/f1=1.24.

In the third embodiment of the present compact imaging lens assembly, the focal length of the first lens element 300 is f1, the focal length of the second lens element 310 is f2, and they satisfy the relation: f1/f2=−0.50.

In the third embodiment of the present compact imaging lens assembly, the thickness on the optical axis of the second lens element 310 is CT2, the focal length of the compact imaging lens assembly is f, and they satisfy the relation: CT2/f=0.41.

In the third embodiment of the present compact imaging lens assembly, the radius of curvature of the object-side surface 301 of the first lens element 300 is R1, the radius of curvature of the image-side surface 302 of the first lens element 300 is R2, and they satisfy the relation: |R1/R2|=0.17.

In the third embodiment of the present compact imaging lens assembly, the radius of curvature of the object-side surface 311 of the second lens element 310 is R3, the radius of curvature of the image-side surface 312 of the first lens element 310 is R4, and they satisfy the relation: R3/R4=−2.07.

In the third embodiment of the present compact imaging lens assembly, the Abbe number of the first lens element 300 is V1, the Abbe number of the second lens element 310 is V2, and they satisfy the relation: V1−V2=32.5.

In the third embodiment of the present compact imaging lens assembly, the distance on the optical axis between the object-side surface 301 of the first lens element 300 and the electronic sensor is TTL, half of the diagonal length of the effective pixel area of the electronic sensor is ImgH, and they satisfy the relation: TTL/ImgH=3.12.

The detailed optical data of the third embodiment is shown in FIG. 8 (TABLE 5), and the aspheric surface data is shown in FIG. 9 (TABLE 6), wherein the units of the radius of curvature, the thickness and the focal length are expressed in mm, and HFOV is half of the maximal field of view.

It is to be noted that TABLES 1-6 (illustrated in FIGS. 4-9 respectively) show different data of the different embodiments, however, the data of the different embodiments are obtained from experiments. Therefore, any compact imaging lens assembly of the same structure is considered to be within the scope of the present invention even if it uses different data. The embodiments depicted above and the appended drawings are exemplary and are not intended to limit the claim scope of the present invention. TABLE 7 (illustrated in FIG. 10) shows the data of the respective embodiments resulting from the equations.

What is claimed is:

1. A compact imaging lens assembly comprising, in order from an object side to an image side:
   a first lens element with positive refractive power, at least one of the object-side and image-side surfaces thereof being aspheric;
   a second lens element with negative refractive power having a concave object-side surface and a concave image-side surface, at least one of the object-side and image-side surfaces thereof being aspheric; and
   an aperture stop disposed between the first lens element and the second lens element; wherein there are two lens elements with refractive power in the compact imaging lens assembly; and wherein the compact imaging lens assembly further provides an electronic sensor for image formation, a distance on the optical axis between the aperture stop and the electronic sensor is SL, a distance on the optical axis between the object-side surface of the first lens element and the electronic sensor is TTL, a distance on the optical axis between the image-side surface of the second lens element and the electronic sensor is Bf, a focal length of the compact imaging lens assembly is f, and they satisfy the relations:

$0.58 < SL/TTL < 0.88$;

$0.18 < Bf/f < 0.60$.

2. The compact imaging lens assembly according to claim 1, wherein the first lens element has its object-side and image-side surfaces aspheric and is made of plastic materials, and the second lens element has its object-side and image-side surfaces aspheric and is made of plastic materials.

3. The compact imaging lens assembly according to claim 2, wherein the second lens element has at least one inflection point formed on the image-side surface.

4. The compact imaging lens assembly according to claim 2, wherein a radius of curvature on the object-side surface of the second lens element is R3, a radius of curvature on the image-side surface of the second lens element is R4, and they satisfy the relation: $-3.50 < R3/R4 < -0.15$.

5. The compact imaging lens assembly according to claim 4, wherein an Abbe number of the first lens element is V1, an Abbe number of the second lens element is V2, and they satisfy the relation: 23.0<V1−V2<46.0.

6. The compact imaging lens assembly according to claim 1, wherein the first lens element has a convex object-side surface.

7. The compact imaging lens assembly according to claim 6, wherein the focal length of the compact imaging lens assembly is f, a focal length of the first lens element is f1, and they satisfy the relation: 1.0<f/f1<1.7.

8. The compact imaging lens assembly according to claim 7, wherein the focal length of the compact imaging lens assembly is f, the focal length of the first lens element is f1, and they satisfy the relation: 1.2<f/f1<1.5.

9. The compact imaging lens assembly according to claim 7, wherein a thickness on the optical axis of the second lens element is CT2, the focal length of the compact imaging lens assembly is f, and they satisfy the relation: 0.18<CT2/f<0.48.

10. The compact imaging lens assembly according to claim 6, wherein a radius of curvature on the object-side surface of the first lens element is R1, a radius of curvature on the image-side surface of the first lens element is R2, and they satisfy the relation: |R1/R2|<0.35.

11. The compact imaging lens assembly according to claim 6, wherein a distance on the optical axis between the image-side surface of the second lens element and the image plane is Bf, the focal length of the compact imaging lens assembly is f, and it satisfies the relation: 0.20<Bf/f<0.35.

12. The compact imaging lens assembly according to claim 6, wherein the first lens element has a convex image-side surface.

13. The compact imaging lens assembly according to claim 1, wherein a distance on the optical axis between the object-side surface of the first lens element and the electronic sensor is TTL, half of the diagonal length of the effective pixel area of the electronic sensor is ImgH, and they satisfy the relation: TTL/ImgH<4.5.

14. A compact imaging lens assembly comprising, in order from an object side to an image side:
    a first lens element with positive refractive power having a convex object-side surface;
    a second lens element with negative refractive power having a concave object-side surface and a concave image-side surface, at least one of the object-side and image-side surfaces thereof being aspheric; and
    an aperture stop disposed between the first lens element and the second lens element; wherein there are two lens elements with refractive power in the compact imaging lens assembly; and wherein the compact imaging lens assembly further provides an electronic sensor for image formation, a distance on the optical axis between the aperture stop and the electronic sensor is SL, a distance on the optical axis between the object-side surface of the first lens element and the electronic sensor is TTL, a radius of curvature on the object-side surface of the first lens element is R1, a radius of curvature on the image-side surface of the first lens element is R2, an Abbe number of the first lens element is V1, an Abbe number of the second lens element is V2, and they satisfy the relations:

0.58<SL/TTL<0.88;

|R1/R2|<0.45;

23.0<V1−V2<46.0.

15. The compact imaging lens assembly according to claim 14, wherein a focal length of the compact imaging lens assembly is f, a focal length of the first lens element is f1, and they satisfy the relation: 1.0<f/f1<1.7.

16. The compact imaging lens assembly according to claim 15, wherein the focal length of the compact imaging lens assembly is f, the focal length of the first lens element is f1, and they satisfy the relation: 1.2<f/f1<1.5.

17. The compact imaging lens assembly according to claim 15, wherein the focal length of the first lens element is f1, a focal length of the second lens element is f2, and they satisfy the relation: −0.80<f1/f2<−0.45.

18. The compact imaging lens assembly according to claim 17, wherein a radius of curvature on the object-side surface of the second lens element is R3, a radius of curvature on the image-side surface of the second lens element is R4, and they satisfy the relation: −3.50<R3/R4<−0.15.

19. The compact imaging lens assembly according to claim 14, wherein the Abbe number of the first lens element is V1, the Abbe number of the second lens element is V2, and they satisfy the relation: 30.0<V1−V2<38.0.

20. The compact imaging lens assembly according to claim 14, wherein a distance on the optical axis between the image-side surface of the second lens element and the electronic sensor is Bf, the focal length of the compact imaging lens assembly is f, and they satisfy the relation: 0.20<Bf/f<0.35.

* * * * *